United States Patent [19]

Inukai et al.

[11] 4,069,167
[45] Jan. 17, 1978

[54] LIQUID CRYSTAL COMPOSITION

[75] Inventors: Takashi Inukai; Hideo Sato; Tetsuya Ishibe, all of Yokohama, Japan

[73] Assignee: Chisso Corporation, Osaka, Japan

[21] Appl. No.: 611,944

[22] Filed: Sept. 10, 1975

[30] Foreign Application Priority Data

Sept. 25, 1974 Japan .................. 49-110767
Sept. 25, 1974 Japan .................. 49-110765

[51] Int. Cl.² .......................... C09K 3/34; G02F 1/13
[52] U.S. Cl. .................................. 252/299; 252/408; 350/160 LC
[58] Field of Search .................. 252/299, 408; 350/160 LC

[56] References Cited

U.S. PATENT DOCUMENTS

| 3,947,375 | 3/1976 | Gray et al. | 252/299 |
| 3,974,087 | 8/1976 | Gray et al. | 252/299 |

FOREIGN PATENT DOCUMENTS

| 807,165 | 3/1974 | Belgium | 252/299 |
| 2,502,904 | 7/1975 | Germany | 252/299 |

Primary Examiner—Benjamin R. Padgett
Assistant Examiner—T. S. Gron
Attorney, Agent, or Firm—Fred Philpitt

[57] ABSTRACT

Liquid crystal compositions which are novel and specified TND compositions having a broad useful temperature range are provided by combining the following groups of compounds and specifying the individual and total amounts of compound or compounds in each group (mol % relative to the total composition). Said groups are 1. two kinds of specified compounds selected from 4-cyano-4''-n-alkylterphenyls, or one kind of compound selected from the above-mentioned specified compounds,
2. three kinds of two kinds of specified compounds selected from 4-cyano-4'-n-alkylbiphenyls, and
3. three or more than three kinds of compounds selected from specified 6 kinds of compounds selected from 4-cyano-4'-n-alkoxybiphenyls.

11 Claims, No Drawings

LIQUID CRYSTAL COMPOSITION

DESCRIPTION OF THE INVENTION

This invention relates to liquid crystal compositions which are suitable to display elements using nematic liquid crystals having twisted arrangement, among liquid crystal compositions. More particularly, this invention relates to liquid crystal compositions consisting of materials selected from biphenyls and terphenyls having cyano groups in the 4-position; having high stability to water, air, light, heat, etc.; and being capable of holding the nematic structure over a broad temperature range. We had confirmed as the result of investigation that biphenyls having cyano groups in the 4-position are, in general, nematic crystals having stability to water, air, light, heat, etc. However, the liquid crystal compositions formed by optionally mixing these compounds have the drawback that the nematic range is narrow, as evident from referential examples hereinafter described. It goes without saying that the useful temperature range of liquid crystal display elements is preferably broader, but liquid crystal compositions which have a broad nematic temperature range and are stable to water, air, light, heat, etc., as shown later in the specific examples of the present invention, among the nematic liquid crystals having twisted arrangement (so-called twisted nematic display and hereinafter abbreviated as TND), have never been known, and a process for preparing such compositions has been, of course, entirely unknown. For such liquid crystal compositions, it is desirous to hold the nematic structure over the range from $-10°$ C to $60°$ C, including room temperature, the requisite property for display elements. However, the TND liquid crystals having such a broad nematic temperature range have, in reality, never been known, and the advent of such liquid crystal compositions has been earnestly desired in the art.

As a result of strenuous research with regard to TND liquid crystals capable of satisfying the above-mentioned desire, we have completed the present invention by finding special and complicated kinds and amounts (mol %) of biphenyls and terphenyls in combination, each having a cyano group in the 4-position as hereinafter described.

Accordingly it is a first object of the present invention to provide liquid crystal compositions having a broad nematic temperature range including room temperature in the center thereof. It is a second object of the present invention to provide liquid crystal compositions which are stable to water, air, light, heat, etc. It is a third object of the present invention to provide TND compositions having a broadened, practically useful range. It is a fourth object of the present invention to provide a novel application field for biphenyls and terphenyls having a cyano group in the 4-position. Other objects and advantages will be evident from the detailed explanation of the invention hereinafter offered.

The liquid crystal compositions of the present invention are novel, and specified TND compositions which comprise a combination of (1) 2 kinds of specified 4-cyano-4''-n-alkylterphenyls or one kind selected therefrom, (2) three kinds of 4'-n-alkylbiphenyls having a cyano group in the 4-position or specified two kinds selected therefrom, and (3) three or more kinds of compounds selected from specified 6 kinds of 4'-n-alkoxybiphenyls having a cyano group in the 4-position, the amounts to be used, of individual compounds in each group and the total amounts of component compound or compounds in one group (mol % relative to the total amount of the composition) are described.

Namely, the present invention resides in:

I. liquid crystal compositions which comprise the following compounds of three groups:
   1. each 4 to 8 mol % of one or two kinds of 4-cyano-4''-n-pentylterphenyl and 4-cyano-4''-n-hexylterphenyl,
   2. each 10 to 45 mol % of three kinds of
      a. 4-cyano-4'-n-phentylbiphenyl,
      b. 4-cyano-4'-n-heptylbiphenyl and
      c. 4-cyano-4'-n-hexylbiphenyl, or
   of two kinds of the above-mentioned (a) and (c), the total amount of the two or three kinds of the above-mentioned compounds being 50 to 75 mol %, and
   3. each 3.5 to 13 mol % of three or more kinds selected from specified 6 kinds of 4-cyano-4'-n-alkoxybiphenyls having 3 to 8 carbon atoms in n-alkoxy group, the total amount of the above-mentioned three or more kinds being 20 – 38 mol %, and all of the above-mentioned mol % being based on the total amount of said compositions;

II. liquid crystal compositions which comprise
   1. 5 – 8 mol % of 4-cyano-4''-n-pentylterphenyl or 4-cyano-4''-n-hexylterphenyl,
   2. 35 – 45 mol % of 4-cyano-4'-n-pentylbiphenyl and 17 – 24 mol % of 4-cyano-4'-n-heptylbiphenyl and
   3. three or more kinds of 4-cyano-4'-n-alkoxybiphenyls having 3 to 8 carbon atoms in n-alkoxy group, the amount of each component being 6 – 13 mol % and the total amount of said three or more kinds being 25 – 38 mol %, and all of the above-mentioned mol % being based on the total amount of said compositions; and III. liquid crystal compositions which comprise
   1. each 4.0 to 7.5 mol % of 4-cyano-4''-n-pentylterphenyl and 4-cyano-4''-n-hexylterphenyl, the difference of the contents of the two compounds being 10% or less of the amount of the component of larger amount,
   2. each 10 – 45 mol % of two or more kinds selected from 4-cyano-4'-n-pentylbiphenyl, 4-cyano-4'-n-hexylbiphenyl and 4-cyano-4'-n-heptylbiphenyl, the total amount of these two or more kinds being 50 – 75 mol %, and
   3. each 3.5 – 13 mol % of three or more kinds selected from 4-cyano-4'-n-alkoxybiphenyls having 3 to 8 carbon atoms in n -alkoxy group, the total amount of said three or more kinds being 20 – 35 mol %, and all of the above-mentioned mol % being based on the total amount of said compositions.

More detailed description will be given with regard to the constitution and effectiveness of the liquid crystal compositions of the present invention.

The compounds of the above-mentioned group (1) useful in the liquid crystal compositions of the present invention are compounds having an n-pentyl group in the 4''-position and compounds having an n-hexyl group in the 4''-position among terphenyls having a cyano group in the 4-position. Both are compounds having a limited liquid crystal range by themselves, and these compounds useful in the present invention are limited only to those having an n-pentyl or n-hexyl group in the 4''-position. Those having other substituents e.g. n-alkyl groups such as n-propyl, n-octyl, etc., and branched alkyl groups such as isobutyl, 2-ethylbutyl, etc. cannot be used for the liquid crystal compositions of the present invention. Further, both the compounds of group (1) are used in the present invention under the following conditions: (a) either one of the two compounds or a combination thereof are used, and there is a minimum and a maximum limit (mol %) in the amount to be used; namely, (b) both the compounds must be used in the range of each 4.8 - 8.0% by weight; and (c) in the improved embodiment of the present invention [i.e. the composition of the above-mentioned (III)], if they are used in the combination of the above-mentioned 2 kinds of the compounds, the difference of the amount to be used, of these two compounds, must be 10 mol % or less of the amount of the compound used in greater amount.

If the manner of use of the above-mentioned two compounds of group (1) in the present invention does not satisfy conditions (a) and (b) in all the embodiments, or if all of the conditions (a), (b) and (c) are not satisfied in the improved embodiment of the present invention, the liquid crystal compositions of the present invention cannot have the desired properties. Namely, they cannot hold the nematic liquid crystal range over such a broad range as at least from $-10°$ C to $60°$ C, and in the case of the improved embodiment of the present invention, they not only cannot hold the above-mentioned nematic liquid crystal range such as from $-10°$ C to $+60°$ C, but also they cannot hold a nematic temperature lower limit lower than $-20°$ C, a temperature upper limit higher than $70°$ C and a nematic temperature range over $80°$ C.

Further the above-mentioned compounds of group (2) useful in the liquid crystal compositions of the present invention, are biphenyls having a cyano group in the 4-position and an n-pentyl, n-hexyl or n-heptyl in the 4'-position. They are compounds having limited liquid crystal ranges by themselves. However, the compounds useful in the present invention are limited only to those having an n-pentyl, n-hexyl or n-heptyl group in the 4'-position. Those having other substituents e.g. n-alkyls such as n-propyl, n-octyl, etc., branched alkyls such as isobutyl, 2-ethylbutyl, etc. cannot be used in the liquid crystal compositions of the present invention. As for the compounds of group (2) of the present invention, in the case where only one kind of group (1) is used, two kinds of (a) and (c) of group (2) are necessarily used in combination with said only one kind of group (1). For the amounts to be used, of respective compounds, there are minimum and maximum limits and a preferable range of the total amount of said two kinds of compounds, based on the total amount of the composition. Namely, two kinds of compounds are used, respectively in the range of 10 - 45 mol % and in total in the range of 50 - 75 mol %. Among said 2 kinds of compounds, 4-cyano-4'-n-pentylbiphenyl is preferably used in the range of 35 - 45 mol % and 4-cyano-4'-n-heptylbiphenyl is preferably used in the range of 17 - 24 mol %. The preferable total amount of both the compounds is in the range of 55 - 65%. In the improved embodiment of the present invention, compounds of group (1) are used in combination, and at the same time, compounds of group (2) are also used in combination of two kinds of optional compounds or a combination of three kinds of compounds. The amounts to be used, of individual compounds of these two kinds or three kinds of compounds and the total amount are in the ranges of 10 - 45 mol % and 50 - 75 mol %, respectively.

Accordingly, when a combination of the above-mentioned three kinds of compounds are used and if the amount to be used, of the largest amount component is, for example, 45 mol %, the amounts of other 2 kinds of components must be at least 10 mol %, respectively. Thus the total amount of the compounds of group (2) is at least 65 mol % when all the three compounds are used and the above-mentioned largest amount is used. Further it is preferable in most cases to use 30 - 40 mol % of the largest amount component and about 20 mol % (individually) of the other one or two components and also to select particularly 4-cyano-4'-n-pentylbiphenyl or 4-cyano-4'-n-heptylbiphenyl as a largest amount component in such cases.

The above-mentioned compounds of group (3) useful in the liquid crystal composition of the present invention and biphenyls having a cyano group in the 4-position and an n-alkoxy group having 3 - 8 carbon atoms in the 4'-position, such as an n-propyloxy group, n-pentyloxy group, n-heptyloxy group, and an n-octyloxy group. These are compounds having a limited liquid crystal range by themselves alone. Those having a side chain other than those above-mentioned, for example, an alkoxy group such as ethoxy group, n-decyl group, a branched alkoxy group such as isobutoxy group, or a 2-ethylbutyloxy group, cannot be used.

The six kinds of compounds of group (3) useful in the present invention are necessarily used (a) in a combination of three or more kinds of compounds. As for the amounts thereof to be used, there are individually maximum and minimum limits and a preferable range of the total amount thereof to be used (mol % relative to the total amount of the composition). Namely, (b) the amount to be used, of individual compounds, is in the range of 3.5 - 13 mol % and the total amount of these three or more kinds of compounds must be in the range of 20 - 38 mol %. Particularly, in the improved embodiment of the present invention, the total amount of the above-mentioned compounds of group (3) must be in the range of 20 - 35 mol %.

Accordingly, if any two kinds of component compounds are used in the maximum amounts of 13 mol % and 4 kinds of component compounds are used in total, one kind of compound among the remaining 2 kinds, must be used in the amount of at least 3.5 mol %. The maximum amount to be used, of the 4th component is as follows:

$$38 - (13 \times 2) = 12 \text{ (mol \%)}$$

$$12 - 3.5 = 8.5 \text{ (mol \%)}$$

The maximum amount to be used, of the smaller amount component is limited by the minimum necessary amount to be used, of other smaller amount component.

Similarly in the improved embodiment of the present invention, if 2 kinds of the component compounds of the above-mentioned group (3) are used in their maximum amounts of 13 mol %, the third component must be used in an amount of at least 3.5 mol %, and therefore, the maximum amount to be used, of the fourth component will be $$35 - (13 \times 2) - 3.5 = 5.5 \text{ (mol \%)}$$

Unlike the compounds of group (2), the compounds of group (3) have no particularly preferable compound or a group of compounds as their largest amount component. It does not matter even when an arbitrary three or more kinds of compounds are used in their average amount (e.g. 7 mol % of each of the 4 kinds and 28 mol % in total).

However, if the conditions of use of the above-mentioned compounds of group (3) useful in the liquid crystal composition of the present invention do not satisfy the limitations of (a) the use of three or more kinds and (b) the range of use of individual compounds and the range of the total amount of use, then it is impossible to attain the object of the present invention (i.e. to obtain TND composition having a broad nematic range) even when the conditions of use of the above-mentioned compounds of group (1) and group (2) are satisfied.

The liquid crystal compositions of the present invention which are admixed so as to satisfy all the above-mentioned conditions have the characteristic of a broad nematic liquid crystal range including room temperature in the center thereof, unlike the cases of the referential examples mentioned later. Particularly they have the characteristic of a broad range for the part lower than room temperature. Namely, as for well known nematic liquid crystal compositions, the limit of the part lower than room temperature is about 0° C or −5° C and moreover such liquid crystal compositions have a relatively narrower range for the part higher than room temperature, e.g. 40° − 50° C. These characteristics have been limiting the practically useful application field of display elements, which use a liquid crystal.

Whereas, the lower limit of the liquid crystal temperature range of the TND compositions of the present invention is lower than −10° C (and in a most excellent example, −14° C). This means that the TND compositions of the present invention have strong resistance to cold.

The upper limit of the liquid crystal temperature range of the compositions of the present invention is higher than 60° C. They are used at about room temperature in the center of the range. They can maintain the liquid crystal state in the temperature range considerably higher than room temperature, i.e. in the range lower than 60° C. In the improved embodiment of the present invention, the lower limit of the temperature range of liquid crystal state of the TND compositions of the present invention, is lower than −10° C (and in a case of most excellent example, it is −23° C), and the upper limit is higher than 60° C (and in a case of most excellent example, it is 73° C). In case of the general embodiment of the present invention, the temperature range of liquid crystal state is 73° − 75° C (see Table 2 mentioned below), whereas in case of improved embodiment it is 82° − 88° C (see Table 4 mentioned below). It is seen from this data that the range is remarkably broader in the case of improved embodiment. Even when a TND composition has a lower temperature range as low as a temperature lower than −20° C, it can hold an upper temperature limit of higher than 60° C in the case of the improved embodiment.

Further the TND compositions of the present invention are chemically stabler than liquid crystal compositions consisting of other compounds e.g. p-alkyl-p′-cyanobiphenyls and p-alkoxybenzylidene-p′-cyanoanilines, and the extent of chemical change of the component compounds exerted by the actions of water, air, light, heat, etc. is extremely small. A long life of practical use as a liquid crystal display element can be expected for the TND compositions of the present invention.

The following referential examples and examples are offered to illustrate the present invention, but they are not intended to limit the scope of the invention.

REFERENTIAL EXAMPLES 1 - 2

The liquid crystal compositions having the compounds shown in Table 1 were tested whereby the lowest limit of nematic temperature range was 0° C (Referential example 2) and the highest limit thereof was 69° C (Referential example 1). In these examples, as a compound corresponding to the compounds of group (1) of the present invention, only one kind of 4-cyano-4″-n-pentylterphenyl was used. As the second compound or compounds to be combined with said compound, 4-cyano-4′-n-pentylbiphenyl or this compound and 4-cyano-4′-n-heptylbiphenyl, both corresponding to the compounds of group (2), were used. With regard to the upper limit of nematic temperature range of the resultant liquid crystal compositions, almost satisfactory numerical values were obtained, but with regard to the lower limit, it was higher than 0° C, i.e. extremely unsatisfactory numerical values were obtained.

Table 1

| liquid crystal compositions of Referential examples 1 - 2 | | |
|---|---|---|
| | Referential examples | |
| Name of compounds | 1 | 2 |
| 4-cyano-4′-n-pentylbiphenyl | 86.7 | 52.6 |
| 4-cyano-4′-n-heptylbiphenyl | 0 | 35.4 |
| 4-cyano-4″-n-pentylterphenyl | 13.3 | 12.0 |
| Total | 100.0 | 100.0 |
| Nematic temperature range | | |
| lower limit ° C | 13 − 14 | 0 |
| upper limit ° C | 66 − 69 | 65.5 |
| range ° C | 53 − 55 | 65.5 |

EXAMPLES 1 - 4

The liquid crystal compositions having the compounds shown in Table 2 were prepared, and their nematic temperature ranges were measured. Values (lower and upper limits) shown in the lower part of this table were obtained. The compositions of each example had the temperature ranges (lower limit of lower than −10° C and upper limit of higher than 60° C) which are the object of the present invention and were stable to water (moisture absorption property), air (susceptibility to oxidation), heat or light (resistance to heat or light) in the case of customary handling.

Table 2

| liquid crystal compositions of Examples 1 - 4 (mol %) | | | | |
|---|---|---|---|---|
| | Examples | | | |
| Name of compounds | 1 | 2 | 3 | 4 |
| 4-cyano-4′-n-pentylbiphenyl | 42.5 | 39 | 43 | 39 |
| 4-cyano-4′-n-heptylbiphenyl | 22 | 19.5 | 22 | 19.5 |
| 4-cyano-4′-n-propyloxybiphenyl | 0 | 11 | 0 | 11 |
| 4-cyano-4′-n-pentyloxybiphenyl | 9.5 | 8 | 9.5 | 8 |
| 4-cyano-4′-n-heptyloxybiphenyl | 8 | 6.5 | 8 | 7 |
| 4-cyano-4′-n-octyloxybiphenyl | 11 | 9.5 | 11 | 9.5 |
| 4-cyano-4″-n-pentylterphenyl | 0 | 0 | 6.5 | 6 |
| 4-cyano-4″-n-hexyleterphenyl | 7 | 6.5 | 0 | 0 |
| Total | 100.0 | 100.0 | 100.0 | 100.00 |
| Neumatic temperature range | | | | |
| lower limit ° C | −11 | −14 | −11 | −14 |
| upper limit ° C | 62 | 61.5 | 62 | 61.5 |
| range ° C | 73 | 75.5 | 73 | 75.5 |

REFERENTIAL EXAMPLES 3 - 5

When the liquid crystal compositions having the compounds shown in Table 3 were tested, the lowest limit of the nematic temperature range (Referential example 4) was 0° C and the highest limit (Referential example 5) was 92° C. In these Referential examples, as the compound corresponding to group (1) of the present invention, only one kind of 4-cyano-4"-n-pentylterphenyl was used, and as the second compound or compounds to be combined with said compound, 4-cyano-4'-n-pentyl (and/or n-heptyl) biphenyl corresponding to group (2) or 4-cyano-4'-n-alkoxybiphenyl (provided that n-alkoxy was n-propyl, n-pentyl, n-heptyl or n-octyl) corresponding to group (3) of the present invention were used. With regard to the upper limit of the nematic temperature range of the resulting liquid crystal compositions, nearly satisfactory numerical values were obtained but with regard to the lower limit, values were higher than 0° C which were extremely unsatisfactory values.

Table 3

| liquid crystal compositions of Referential examples 3 - 5 | | | |
|---|---|---|---|
| | Referential examples (compositions) | | |
| Name of compounds | 3 | 4 | 5 |
| 4-cyano-4'-n-pentylbiphenyl | 86.7 | 52.6 | 0 |
| 4-cyano-4'-n-heptylbiphenyl | 0 | 35.4 | 0 |
| 4-cyano-4'-n-propyloxybiphenyl | 0 | 0 | 23.1 |
| 4-cyano-4'-n-pentyloxybiphenyl | 0 | 0 | 22.9 |
| 4-cyano-4'-n-heptyloxybiphenyl | 0 | 0 | 18.8 |
| 4-cyano-4'-n-octyloxybiphenyl | 0 | 0 | 23.9 |
| 4-cyano-4"-n-pentylterphenyl | 3.3 | 12 | 11.3 |
| Total | 100.0 | 100.0 | 100.0 |
| Nematic temperature range | | | |
| lower limit ° C | 13 – 14 | 0 | 5 |
| upper limit ° C | 66 – 69 | 65.5 | 92 |

EXAMPLES 5 – 8

The liquid crystal compositions consisting of the compounds shown in Table 4 were prepared and their nematic temperature ranges were measured. The values (upper and lower limits ° C) shown in the lower part of the table were obtained. The compositions of these Examples had the temperature ranges of the object of the present invention (lower limit of lower than −10° C and upper limit of higher than 60° C) and were stable to water (moisture absorption property), air (susceptibility to oxidation, etc.), heat or light (heat and light resistance) in customary handling.

Table 4

| liquid crystal compositions (mol %) of Examples 5 – 8 | | | | |
|---|---|---|---|---|
| | Examples | | | |
| Name of compounds | 5 | 6 | 7 | 8 |
| 4-cyano-4'-n-pentylbiphenyl | 37 | 31.5 | 40.5 | 29.5 |
| 4-cyano-4'-n-hexylbiphenyl | 0 | 27 | 0 | 24 |
| 4-cyano-4'-n-heptylbiphenyl | 18 | 14 | 21 | 13 |
| 4-cyano-4'-n-propyloxybiphenyl | 11 | 0 | 0 | 8 |
| 4-cyano-4'-n-pentyloxybiphenyl | 7.2 | 5.5 | 8.5 | 5 |
| 4-cyano-4'-n-heptyloxybiphenyl | 6 | 5 | 7 | 4 |
| 4-cyano-4'-n-octyloxybiphenyl | 9 | 7 | 10 | 6.5 |
| 4-cyano-4"-n-pentylterphenyl | 5.7 | 5 | 6.3 | 4.6 |
| 4-cyano-4"-n-hexylterphenyl | 6.1 | 5 | 6.7 | 4.9 |
| Total | 100.0 | 100.0 | 100.0 | 100.0 |
| Nematic temperature range | | | | |
| lower limit ° C | −16 | −21 | −12 | −23 |
| upper limit ° C | 72 | 61 | 73 | 62 |
| range ° C | 88 | 82 | 85 | 85 |

What is claimed is:

1. A liquid crystal composition having a liquid crystal temperature range encompassing the range of −10° C to 60° C, comprising in combination
  a. at least one component selected from the group consisting of
    $a_1$. 4-cyano-4"-n-pentylterphenyl in an amount within the range of 4 to 8 mol %, and
    $a_2$. 4-cyano-4"-hexylterphenyl, in an amount within the range of 4 to 8 mol%,
  b. at least two components selected from the group consisting of
    $b_1$. 4-cyano-4'-n-pentylbiphenyl, in an amount between 10 to 45 mol%,
    $b_2$. 4-cyano-4'-n-heptylbiphenyl in an amount between 10 to 45 mol %, and
    $b_3$. 4-cyano-4'-n-hexylbiphenyl in an amount between 10 to 45 mol %,
  the total amount of said at least two components being within the range of 50 to 75 mol %, and
  c. at least three components selected from the group consisting of
    $c_1$. 4-cyano-4'-n-propyloxybiphenyl, 3.5–13 mol %,
    $c_2$. 4-cyano-4'-n-butyloxybiphenyl, 3.5 – 13 mol %,
    $c_3$. 4-cyano-4'-n-pentyloxybiphenyl, 3.5 – 13 mol %,
    $c_4$. 4-cyano-4'-n-hexyloxybiphenyl, 3.5 – 13 mol %,
    $c_5$. 4-cyano-4'-n-heptyloxybiphenyl, 3.5 – 13 mol %, and
    $c_6$. 4-cyano-4'-n-octyloxybiphenyl, 3.5 – 13 mol %,
  the total amount of said at least three components being within the range of 20 – 38 mol %,
  all of the above mol percentages being based on the total composition and the total mol% always being 100.

2. A liquid crystal composition according to claim 1 wherein
  the amount of component ($a_1$) or ($a_2$) is within the range of 5 – 8 mol %,
  the amount of component ($b_1$) is within the range of 35 – 45 mol %,
  the amount of component ($b_2$) is within the range of 17 – 24 mol %, and
  the individual amounts of the components ($c_1$), ($c_2$), ($c_3$), ($c_4$), ($c_5$) and ($c_6$) is within the range of 6 – 13 mol % and the total amount of said at least three components is within the range of 25 – 38 mol %.

3. A liquid crystal composition according to claim 1 wherein
  components ($a_1$) and ($a_2$) are both present, each in an amount within the range of 4.0 to 7.5 mol %, the component which is present in the lesser amount being present in an amount which is less than 10 mol% smaller than the component which is present in the greater amount, and
  the total amount of said at least three components in (c) being within the range of 20 – 35 mol %.

4. A liquid crystal composition according to claim 1 comprising the following components in the indicated amounts:
  4-cyano-4'-n-pentylbiphenyl, 42.5 mol %
  4-cyano-4'-n-heptylbiphenyl, 22 mol %
  4-cyano-4'-n-pentyloxybiphenyl, 9.5 mol %
  4-cyano-4'-n-heptyloxybiphenyl, 8 mol %
  4-cyano-4'-n-octyloxybiphenyl, 11 mol %
  4-cyano-4"-n-hexylterphenyl, 7 mol %.

5. A liquid crystal composition according to claim 1 comprising the following components in the indicated amounts:
  4-cyano-4'-n-pentylbiphenyl, 37 mol %
  4-cyano-4'-n-heptylbiphenyl, 18 mol %
  4-cyano-4'-n-propyloxybiphenyl, 11 mol %
  4-cyano-4'-n-pentyloxybiphenyl, 7.2 mol %
  4-cyano-4'-n-heptyloxybiphenyl, 6 mol %
  4-cyano-4'-n-octyloxybiphenyl, 9 mol %
  4-cyano-4"-n-pentylterphenyl, 5.7 mol %
  4-cyano-4'-n-hexylterphenyl, 6.1 mol %.

6. A liquid crystal composition according to claim 1 comprising the following components in the indicated amounts:
4-cyano-4'-n-pentylbiphenyl, 39 mol %
4-cyano-4'-n-heptylbiphenyl, 19.5 mol %
4-cyano-4'-n-propyloxybiphenyl, 11 mol %
4-cyano-4'-n-pentyloxybiphenyl, 8 mol %
4-cyano-4'-n-heptyloxybiphenyl, 6.5 mol %
4-cyano-4'-n-octyloxybiphenyl, 9.5 mol %
4-cyano-4"-n-hexylterphenyl, 6.5 mol %.

7. A liquid crystal composition according to claim 1 comprising the following components in the indicated amounts:
4-cyano-4'-n-pentylbiphenyl, 43 mol %
4-cyano-4'-n-heptylbiphenyl, 22 mol %
4-cyano-4'-n-pentyloxybiphenyl, 9.5 mol %
4-cyano-4'-n-heptyloxybiphenyl, 8 mol %
4-cyano-4'-n-octyloxybiphenyl, 11 mol %
4-cyano-4'-n-pentylterphenyl, 6.5 mol %.

8. A liquid crystal composition according to claim 1 comprising the following components in the indicated amounts:
4-cyano-4'-n-pentylbiphenyl, 39 mol %
4-cyano-4'-n-heptylbiphenyl, 19.5 mol %
4-cyano-4'-n-propyloxybiphenyl, 11 mol %
4-cyano-4'-n-pentyloxybiphenyl, 8 mol %
4-cyano-4'-n-heptyloxybiphenyl, 7 mol %
4-cyano-4'-n-octyloxybiphenyl, 9.5 mol %
4-cyano-4"-n-pentylterphenyl, 6 mol %.

9. A liquid crystal composition according to claim 1 comprising the following components in the indicated amounts:
4-cyano-4'-n-pentylbiphenyl, 31.5 mol %
4-cyano-4'-n-hexylbiphenyl, 27 mol %
4-cyano-4'-n-heptylbiphenyl, 14 mol %
4-cyano-4'-n-pentyloxybiphenyl, 5.5 mol %
4-cyano-4'-n-heptyloxybiphenyl, 5 mol %
4-cyano-4'-n-octyloxybiphenyl, 7 mol %
4-cyano-4"-n-pentylterphenyl, 5 mol %
4-cyano-4"-n-hexylterphenyl, 5 mol %.

10. A liquid crystal composition according to claim 1 comprising the following components in the indicated amounts:
4-cyano-4'-n-pentylbiphenyl, 40.5 mol %
4-cyano-4'-n-heptylbiphenyl, 21 mol %
4-cyano-4'-n-pentyloxybiphenyl, 8.5 mol %
4-cyano-4'-n-heptyloxybiphenyl, 7 mol %
4-cyano-4'-n-octyloxybiphenyl, 10 mol %
4-cyano-4"-n-pentylterphenyl, 6.3 mol %
4-cyano-4"-n-hexylterphenyl, 6.7 mol %.

11. A liquid crystal composition according to claim 1 comprising the following components in the indicated amounts:
4-cyano-4'-n-pentylbiphenyl, 29.5 mol %
4-cyano-4'-n-hexylbiphenyl, 24 mol %
4-cyano-4'-n-heptylbiphenyl, 13 mol %
4-cyano-4'-n-propyloxybiphenyl, 8 mol %
4-cyano-4'-n-pentyloxybiphenyl, 5 mol %
4-cyano-4'-n-heptyloxybiphenyl, 4 mol %
4-cyano-4'-n-octyloxybiphenyl, 6.5 mol %
4-cyano-4"-n-pentylterphenyl, 4.6 mol %
4-cyano-4"-n-hexylterphenyl, 4.9 mol %.

* * * * *